United States Patent [19]

Nagy

[11] 3,980,800

[45] Sept. 14, 1976

[54] POLYMERS OF N-(CHLOROALKOXYMETHYL)ACRYLAMIDES, QUATERNARY AMMONIUM DERIVATES

[75] Inventor: Daniel Elmer Nagy, Stamford, Conn.

[73] Assignee: American Cyanamid Company, Stamford, Conn.

[22] Filed: Sept. 25, 1975

[21] Appl. No.: 616,515

Related U.S. Application Data

[62] Division of Ser. No. 479,337, June 14, 1974, Pat. No. 3,957,869.

[52] U.S. Cl. .................................... 526/23; 210/54; 260/29.6 HN; 260/29.6 H; 260/29.6 AT; 526/49; 526/50; 526/218; 526/259; 526/260; 526/263; 526/292
[51] Int. Cl.$^2$ ................. C08F 26/00; C08F 126/08; C08F 226/00; C08F 18/00
[58] Field of Search .......... 526/292, 288, 259, 260, 526/263, 23, 50, 49

[56] References Cited

UNITED STATES PATENTS

| | | | |
|---|---|---|---|
| 2,897,200 | 7/1959 | Maeder et al. | 526/292 X |
| 2,980,657 | 4/1961 | Melamed | 526/23 |
| 3,166,540 | 1/1965 | Melamed et al. | 526/23 |
| 3,170,901 | 2/1965 | Melamed et al. | 526/23 |
| 3,186,973 | 6/1965 | Maeder | 526/292 X |
| 3,198,762 | 8/1965 | Maeder et al. | 526/292 X |
| 3,666,810 | 5/1972 | Hoke | 526/292 X |
| 3,883,491 | 5/1975 | Hoke | 526/292 X |

*Primary Examiner*—Joseph L. Schofer
*Assistant Examiner*—Herbert J. Lilling
*Attorney, Agent, or Firm*—Charles F. Costello, Jr.; James T. Dunn

[57] ABSTRACT

The N-(chloroalkoxymethyl)acrylamides provide a practical means for the manufacture of vinyl quaternary compounds and water-soluble acrylamide polymers which contain vinyl quaternary linkages. Such polymers possess valuable dry strengthening properties when used in the manufacture of paper.

3 Claims, No Drawings

POLYMERS OF N-(CHLOROALKOXYMETHYL)ACRYLAMIDES, QUATERNARY AMMONIUM DERIVATES

This is a division of application Serial No. 479,337 filed June 14, 1974 now U.S. Pat. No. 3,957,869.

BACKGROUND OF THE INVENTION

1. Field of the Invention

The present invention relates to water-soluble quaternary ammonium vinyl monomers, to cationic water-soluble homopolymers and copolymers of these monomers with acrylamide and other compounds, to a vinyl compound specially useful for production of the aforesaid quaternary ammonium monomers, to paper of improved dry strength resulting from a content of the aforesaid copolymers, and to the various methods involved in making the foregoing products.

Dry strength paper is a specialty of the papermaker's art. It is paper which possesses excellent tensile strength when dry but which possesses substantially no tensile strength when wet. Dry strength paper rapidly disintegrates when allowed to fall into a natural environment and so solves an ecological problem.

There is also a demand for a cationic polymer which provides only dry strength, but which can be made to provide wet strength as well by an inexpensive and easy modification.

At the present time, dry strength paper is manufactured on a large commercial scale by adding a water-soluble anionic polymer to an aqueous suspension of cellulose papermaking fibers, precipitating the polymer on the fibers by the action of alum, forming the fibers into a web and drying the web; cf. Canadian Pat. No. 477,265. A disadvantage of the process is that the papermaking system throughout the operation is at an acid pH with resulting corrosion of the papermaking machine. A further disadvantage is that the paper which it produces is acid and undergoes acid tendering as it ages. An additional disadvantage is that the sulfate ions (introduced as part of the alum) are not adsorbed by the cellulose and so accumulate in the aqueous phase of the system, creating a disposal problem. Moreover, anionic polymers are poorly effective in papermaking systems which contain black liquor solids, so that for best results the pulps must be well washed. Water of sufficient purity for pulp washing is now a critical commodity in many paper mills.

2. Description of the Prior Art

It has long been known that the water-soluble vinyl cationic polymers which are composed of acrylamide units in predominant proportion and of vinyl quaternary ammonium units in minor proportion are good dry strengthening agents when added to the aqueous cellulose fiber suspensions from which paper is made (cf. Wilson et al. U.S. Pat. Nos. 2,884,057; 2,884,058; and Moore U.S. Pat. No. 3,077,430) even in the absence of alum, at alkaline pH values up to at least pH 10; that they are effective at acid pH values at least down to pH 4; and that they are not sensitive to dissolved sulfate ions (at least in moderate amount). These polymers therefore possess major practical advantages.

A disadvantage of the polymers of the aforesaid patents is that they are difficult and costly to make, so that they are uneconomic. Accordingly, attempts to introduce these polymers into the commercial manufature of paper have not proved successful.

SUMMARY OF THE INVENTION

The discovery has now been made that benefits indicated above can be attained in an economic way by starting with a water-soluble N-(chloro $C_2$-$C_5$ alkoxymethyl) acrylamide represented by the formula

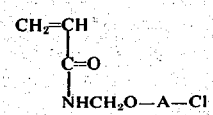

wherein A represents a $C_2$-$C_5$ alkyl substituent as precursor of the cationic component. I have found that this compound is simple and cheap to make, and that highly effective cationic dry strengthening polymers can be made either by quaternizing the compound with a suitable water-soluble amine and then copolymerizing the product with acrylamide or by performing the copolymerization first and then quaternizing the resulting polymer. The quaternized monomers have the theoretical formula:

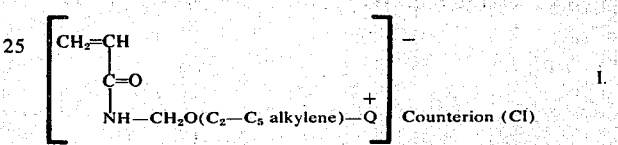

wherein "$C_2$-$C_5$ alkylene" designates a hydrocarbon group, for example $-CH_2CH_2-$, $-CH(CH_3)-CH_2-$ and $CH_2CH_2CH_2CH_2-$, and Q designates the residue of a water-soluble tertiary amine (i.e., a hydrophilic quaternary ammonium group). The substituents retain their structure when the monomers are subjected to vinyl polymerization.

I have found that the water-soluble cationic polymers composed of acrylamide units in preponderant proportion and the above-described vinyl quaternary ammonium units in minor proportion are cheaply and easily prepared, and possess the following beneficial properties: they are storage-stable at acid, neutral and alkaline pH values; they are strongly cationic excellent dry strength agents which are suitable for use as beater or "wet end" additives in the manufacture of paper, and they are effective for this purpose in the principal pulps and water systems employed in modern paper manufacture.

A particular advantage of these polymers is that they do not require the presence of alum or other precipitating agent for their utility, and they provide excellent dry strengthening in the prevalent acidic pH range (4–6) as well as in the alkaline pH range (8–12) needed for production of paper which contains alkaline filler material. Since they are not sensitive to dissolved sulfate ions, they can be used in systems wich have been previously used for the manufacture of rosin sized paper.

A surprising property of the N-(chloro $C_2$-$C_5$ alkoxymethyl) acrylamides in polymerized or unpolymerized state is the stability of their ether linkages. It might be expected that this linkage would hydrolyze easily at moderate conditions of pH and temperature, either before or after the quaternization reaction, as is more particularly hereinafter disclosed. It also might be expected that this linkage would transamidate easily. However, I have found that this and the other two principal linkages in the compound (the amide and quaternary ammonium linkages) are all adequately stable over the broad pH range from 3 to 12 to permit aqueous solutions of the polymer to be shipped and consumed in accordance with commercial practice.

I have also found that the vinyl double bond is strongly resistant to uncatalyzed addition reactions, but undergoes normal vinyl polymerization at any pH in the range of 3–10 without substantial decomposition. As a result, the compound has broad utility as a comonomer capable of providing cationic sites in vinyl polymerization.

I have finally found that the compound, before or after vinyl polymerization, quaternizes readily with any water-soluble tertiary amine, a feature which provides it with unusual technical flexibility.

More in detail, according to the invention, the preferred starting materials, namely, the N-chloro $C_2$–$C_5$ alkoxymethyl)-acrylamides, are prepared by reacting a $C_2$–$C_5$ chloroalkanol with N-(hydroxymethyl)acrylamide (made by reacting acrylamide with formaldehyde).

Taking 2-chloro-1-ethanol as an example of the chloroalkanol, the reaction proceeds as follows:

present can be recovered by distillation or a selective solvent. The product need not be recovered in dry form, but if desired, the water can be removed by vacuum or azeotropic distillation or by use of anhydrous methanol.

According to the second method, the N-substituted acrylamide is first copolymerized with the unsubstituted acrylamide and the pendant chloro (or bromo) substituents are then quaternized as described above. This method is not preferred because the copolymerization reaction is generally performed in dilute aqueous solution, and a larger excess of the tertiary amine generally must be used, or a large amount of water must be removed.

FOr the quaternization reaction any water-soluble tertiaary amine can be used. Suitable amines of this class include trimethylamine, tripropylamine, pyridine, the picolines, decahydroquinoline, N-methylmorpholine, triethanolamine, dimethyl 2-hydroxyethyl amine, and N,N-diethylaniline, although they quaternize at different speeds. Trimethylamine is preferred for the purpose because it is readily available at low cost, because its molecular weight is low, because it is stable,

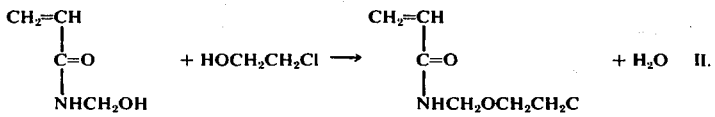

I have found that high yields of the desired product are obtained at 60°C. (without need for pressure equipment) when 2-chloro-1-ethanol is present in excess and the reaction mixture is maintained at a highly acid pH (below about 2). The reaction is substantially complete in one hour, after which the excess chloroethanol can be recovered by distillation under vacuum, and the ionic chloride which forms can be recovered by addition of sodium bicarbonate; the chloride precipitates as sodium chloride and can be filtered off. The residue is a tan liquid, N-(2-chloroethoxymethyl)acrylamide.

These products are soluble in cold (or, if necessary, hot) water.

For this reaction, any of the $C_2$–$C_5$ chloroalkanols can be used, including 2-chloro-1-ethanol (also known as ethylene chlorohydrin), 3-chloro-1-propanol (also known as trimethylene α-chlorohydrin), and 3-chloroamyl alcohol (3-chloro-1-pentanol). The corresponding bromo compounds are chemical equivalents and can also be used. In practice I prefer to use 2-chloro-1-ethanol because this compound is commercially available at low cost and has a lower boiling point than the other compounds mentioned, which facilitates recycling of any excess present.

The dry strengthening polymers of the present invention can be prepared by two different procedures.

According to the first procedure, a N-(chloro-$C_2$–$C_5$-alkoxy-methyl)acrylamide is quaternized in any convenient manner and the resulting acrylamidomethoxyalkyl quaternary is then subjected to a vinyl polymerization with acrylamide or with methacrylamide (a functional equivalent). In this procedure, the quaternization reaction is conveniently performed by dissolving the one mol of the N-substituted acrylamide and between 0.5 and 1.5 mol of a water-soluble tertiary amine in about the minimum amount of water needed for the purpose, and heating the solution slowly (e.g., over three hours) from 30°C. to 95°C. Any excess amine and because any unreacted excess of the material can be easily recovered by distillation after the quaternization.

The quaternized N-(chloro-$C_2$–$C_5$alkyloxymethyl)acrylamide can be polymerized with acrylamide (or with methacrylamide) by any of the procedures by which acrylamide itself has been homopolymerized in the past. There is no criticality in the particular method which may be selected.

In practice I prefer to perform the copolymerization in aqueous solution in the absence of oxygen using a redox catalyst; cf. U.S. Pat. No. 2,923,701. The product is a sticky hydrous gel which can be dried for shipment by the method of U.S. Pat. No. 3,634,944.

The reaction is performed by heating the mixture at a temperature in the range of about 40°C.–100°C. The reaction proceeds unnecessarily slowly below the range, and undesirable side reactions (including imide formation) occur above that range.

The quaternizable acrylamides can also be made by two other methods, both transetherifications.

According to one method, a water-soluble N-(alkoxymethyl)acrylamide (made by reacting N-(hydroxymethyl)acrylamide with ethyl alcohol) and a water-soluble hydroxy($C_2$–$C_5$ alkyl) di($C_2$–$C_5$ alkyl)amine are heated together at an acid pH until evolution of alkanol has substantially ceased. Taking dimethyl 2-(hydroxyethyl)amine as an example of the amine, the transetherification proceeds as follows:

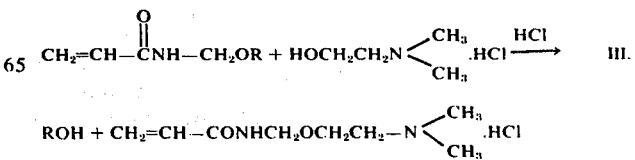

where R represents a $C_1$–$C_{12}$ alkyl and preferably a $C_1$–$C_4$ alkyl group (so that the alcohol formed by the transetherification reaction volatilizes as it is formed). The reaction proceeds very rapidly at 50°C.–70°C. under vacuum. The product can be quaternized with a $C_2$–$C_5$ alkyl or hydroxyalkyl halide, dimethyl sulfate, or any other convenient quaternizing agent (which provides sulfate, chloride, bromide, iodide etc. counterions).

An advantage of this method is that the 2-chloro-1-ethanol (which is toxic) is not needed, and the 2-hydroxyethyl dialkyl amine need not be used in excess.

If desired, the hydroxyalkyl dialky amine can be replaced by a hydroxyalkyl tri($C_2$–$C_5$ alkyl) ammonium halide with direct production of the acrylamide quaternary.

According to the other method, the transetherification is performed by use of a $C_2$–$C_5$ chloroalkanol. Taking 2-chloro-1-ethanol as an example of the alcohol, it proceeds as follows:

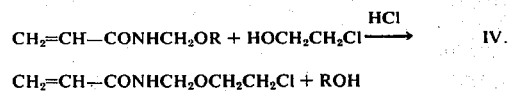

$$CH_2=CH-CONHCH_2OR + HOCH_2CH_2Cl \xrightarrow{HCl}$$
$$CH_2=CH-CONHCH_2OCH_2CH_2Cl + ROH$$
IV.

wherein R represents a $C_1$–$C_{12}$ (and preferably a $C_1$–$C_4$) alkyl group. Here again only one mol of the chloroalkanol is needed for good yields, and no more than a slight (e.g., 0.1 mol) excess is needed to effect substantially complete transetherification.

If desired, the quaternary may be homopolymerized. The product has a very high cationic density, and is specially useful as a flocculant for suspended solids in water (e.g., sewage solids, colloidal coal particles, ore and clay particles, and cellulose fines).

In general, at least one mol percent of quaternary units are needed to render the polymer self-substantive to cellulose under paper-making conditions, and about five mol percent is needed to avoid the risk of inefficient performance. On the other hand, more than 10 mol percent of quaternary units is unnecessary to ensure efficient adsorption, and more than about 25 mol percent is often detrimental. Accordingly, the polymers which are intended for use as strengthening agents contain 1 to 25 mol percent of quaternary units (and 99 – 75 mol percent of acrylamide units), whereas the polymers which are preferred for the purpose contain 5 to 10 mol percent of quaternary units (and 95 to 90 mol percent of acrylamide units).

If desired, the polymers may contain minor amounts of other units which act as diluent or spacing units, so long as they do not change the essential water-soluble cationic character of the polymer. Thus the polymer may contain minor amounts of vinylamine, methyl acrylate, vinyl acetate, acrylonitrile, and acrylic acid linkages. The acrylic acid linkages decrease the cationicity of the polymer, but are helpful in that they render the polymer amphoteric and so suitable for use in pulps contaning alum and having an acid pH.

The invention is further described in the examples which follow. These examples are preferred embodiments of the invention and are not to be construed in limitation thereof.

DESCRIPTION OF THE PREFERRED EMBODIMENTS

EXAMPLE 1

The following illustrates the preparation of a N-(2-chloroalkoxymethyl)acrylamide by a process according to the present invention.

To a solution of 332 g. of 91% N-(hydroxymethyl) acrylamide (3.13 mols) in 1640 g. (20.4 mols) of 2-chloroethanol in a reaction flask equipped with thermometer, stirrer, dropping funnel and distillation head is added sufficient (about 3 ml.) of 20 N $H_2SO_4$ to decrease the pH of the solution below 0.5. The solution is heated at 60°C. for one hour, cooled to room temperature and adjusted to pH 8 with 10% aqueous NaOH. The reaction mixture is then filtered to remove the sodium chloride which forms. The filtrate is returned to the reaction vessel. There are then added 0.025 g. of phenothiazine as free radical inhibitor, 0.05 g. of the methyl ether of hydroquinone as polymerization inhibitor, and 2 g. of $NaHCO_3$ as stabilizer, to provide a pH of about 8. The water and excess 2-chloroethanol are removed by distillation first at 54°C. to 60°C. under a vacuum of 28 to 28.8 inches and then at 80°C. under a vacuum of 4 mm. of mercury. The product is then filtered. It is substantially pure N-(2-chloroethoxymethyl)acrylamide, and is a clear faintly yellow oil.

The product is adjusted to pH 7 and stored in a dark stoppered bottle at −20°C. to inhibit decomposition. It is substantially unchanged after a month.

EXAMPLE 2

The procedure of Example 1 is repeated except that 1900 g. of 3-chloro-1-propanol is used in place of the 2-chloro-1-ethanol. N-(3-Chloropropoxymethyl)acrylamide is obtained.

EXAMPLE 3

The following illustrates the preparation of a N-(2-chloroalkoxymethyl)acrylamide by a transetherification reaction.

To a mixture of 115 g. (1 mol) of N-(methoxymethyl-)acrylamide and 160 g. (2 mols) of peroxide-free 2-chloroethanol in a flask set up for vacuum distillation is added 1.5 ml. of 25% aqueous hydrochloric acid Vacuum is applied. The mixture is slowly heated to 60°C. (over 30 minutes) and the vacuum is increased to 4 mm. over this period of time. The temperature is then raised to 80°C. with continuation of the vacuum to strip off the excess chloroethanol and the methanol which is formed by the reaction.

EXAMPLE 4

The following illustrates the preparation of a water-soluble quaternary ammonium monomeric derivative of a N-(2-chloroalkoxymethyl)acrylamide.

In a three-necked flask equipped with stirrer, thermometer and reflux condenser, a mixture of 302 g. of 30% aqueous trimethylamine (1.54 mol) and 232 g. (1.54 mol) of the N-(2-chloroethoxymethyl)acrylamide of Example 1 is heated to 30°C. and is maintained at that temperature for one hour, a dry ice-acetone mixture being applied in the condenser as needed to control the exotherm which develops. The water present is about the minimum amount which is needed to dissolve the reagents and the product. The mixture is then heated at 55°C.–65°C. for one hour, at 87°C. for 30 minutes, and at 93°C.–95°C. for ten minutes. The resulting alkaline solution is then cooled and its pH adjusted to 7 by addition of 10% aqueous hydrochloric acid. The water and any residual trimethylamine are removed by distillation under a vacuum of 4 mm. of mercury. The product is 2-(acrylamidomethyoxy)ethyl trimethyl ammonium chloride having the theoretical formula:

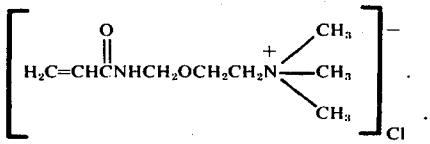

EXAMPLE 5

The procedure of Example 4 is repeated, except that the trimethylamine solution is replaced by 158 g. of 2-(dimethylamino)ethanol in 250 cc. of water. [2-(Acrylamidomethoxy)ethyl]dimethyl ethanol ammonium chloride is formed.

EXAMPLE 6

The procedure of Example 4 is repeated except that the trimethylamine solution is replaced by 156 g. of N-methylmorpholine dissolved in 250 g. of water. 2-(Acrylamidomethoxy) ethyl methyl morpholinium chloride is obtained.

EXAMPLE 7

The following illustrates the preparation of a copolymer consisting essentially of N-2(acrylamidomethoxy) ethyl trimethyl ammonium chloride and acrylamide linkages or units which is effective as dry strengthening agent, prepared by a method wherein the polymerization step is performed after the quaternization step.

An aqueous solution of 20 g. (0.0895 mol) of (2-acrylamidomethoxy)ethyl trimethyl ammonium chloride (prepared by the method of Example 4), 30 g. (0.739 mol) of acrylamide, and 0.2 g. of azobisisobutyronitrile in 520 g. of deoxygenated water is heated under a nitrogen blanket for three hours at 40°C.–55°C., at which time the reaction is substantially complete.

EXAMPLE 8

The procedure of Example 7 is repeated except that the vinyl quaternary monomer is replaced by 140 g. of the vinyl quaternary monomer of Example 5. A similar polymer is obtained.

EXAMPLE 9

The procedure of Example 7 is repeated except that the vinyl quaternary monomer is replaced by 78.5 g. of the vinyl quaternary monomer of Example 5. The resulting pyridinium polymer is about as effective as flocculant as the polymer of Example 6.

EXAMPLE 10

The procedure of Example 7 is repeated except that the vinyl quaternary monomer is replaced with 24 g. of the vinyl quaternary monomer of Example 6. A similar polymer is obtained.

EXAMPLE 11

The following illustrates the manufacture of a copolymer according to the present invention by a process wherein the quaternization step is performed after the vinyl polymerization step.

A reaction flask fitted with stirrer, thermometer, dropping funnel and gas inlet tube is flushed out with nitrogen, and into the flask are placed under nitrogen 10 g. (0.06 mol) of N-(2-chloroethoxymethyl)acrylamide, 40 g. (0.57 mol) of acrylamide, 1750 ml. of water and 0.3 g. each of sodium metabisulfite and ammonium persulfate. The solution is heated to 40°C. An exothermic reaction occurs which is controlled at 45°C. by application of cooling. After one hour at 40°C.–45°C. the reaction is substantially complete and the product is a viscous solution composed of the unsubstituted acrylamide and the N-substituted acrylamide in 90.5 : 9.5 molar ratio.

To the solution is added with stirring 79 g. of a 10% by weight aqueous solution of N-propyl morpholine, (0.06 mol) and the solution is maintained at 70°C. for 24 hours, at which point quaternization is substantially complete.

The product is an effective strengthening agent for paper when added to beater pulp at pH 8 in amount equal to 0.3% of the dry weight of the fibers.

EXAMPLE 12

The following illustrates the preparation of a different copolymer according to the present invention starting with an acrylamido tertiary amine, the quaternary ammonium groups being formed as a last step after completion of the polymerization reaction.

To 132 g. of 2-(dimethylamino)ethanol hydrochloride (prepared by neutralizing the free base in isobutyl alcohol solution with concentrated aqueous hydrochloride followed by the addition of benzene and distillation at atmospheric pressure to remove the water by azeotropic distillation and then under vacuum to remove the solvents; in apparatus set for vacuum distillation with the receiver cooled in dry ice-acetone mixture; is added 167 g. (1.02 mol) of N-isobutoxymethyl acrylamide 95% pure containing 200 p.p.m. methyl ethyl hydroquinone as inhibitor. To the resulting clear solution is added 0.1 g. of potassium iodide and 1.5 ml. of concentrated hydrochloric acid.

The reaction mixture is heated to 70°C.–75°C. A vacuum of 16 mm. of mercury is applied and a small amount of air is bubbled through the solution to stabilize the distillation and to assist removal of the isobutanol. After five minutes the vacuum is increased to 3 mm. and the temperature raised to 80°C. over 10 minutes.

The vacuum is then broken. The weight of distillate is 57 g. To this is added 0.5 ml. of concentrated hydrochloric acid and heating is continued at 80°C. for 15 minutes under a vacuum of 4 mm. An additional 16 g. of distillate is obtained. The total yield is 73 g., equivalent to 95% of the theoretical.

The distillate is a viscous liquid. It is dissolved in 100 cc. of water containing 5 ml. of 10% NaOH. The resulting solution is filtered to remove particles of gel. The filtrate weighs 511 g. and contains 38.4% of N-(dimethylaminoethoxymethyl)acrylamide hydrochloride.

EXAMPLE 13

The following illustrates the preparation of a homopolymer according to the present invention.

The procedure of Example 7 is repeated except that 210 g. (1 mol) of 2-(acrylamidomethoxy)ethyl trimethyl ammonium chloride is used in place of the mixture of monomers of Example 7.

The product is a tan syrup which dissolves readily in water.

EXAMPLE 14

The polymer product of Example 13 is diluted to 0.1% solids with water, and is added with gentle stirring to aliquots of laboratory stock aqueous suspensions as follows:
  Cellulose fines (in white water from papermaking systems).
  Colloidal soft coal.
  Colloidal argillaceous matter (river mud).
  Mine effluent water (colloidal ore slimes).
  Sewaage sludge suspension.
In each instance the solution is added in amount sufficient to provide 50 parts of the polymer per million parts by weight of the suspension to be clarified. In each instance rapid and substantially complete flocculation occurs with development of a clear phase after settling.

EXAMPLE 15

The following illustrates the preparation of a vinyl quaternary ammonium compound by transetherification of a lower alkoxy alkyl acrylamide with a nonvolatile hydroxyalkyl trialkyl ammonium salt.

A mixture of 70 g. of 2-hydroxyethyl trimethyl ammonium chloride (choline chloride) and (85 g.) of N-(isobutoxymethyl)acrylamide is acidified with 1.5 ml. of hydrochloric acid and 0.1 g. of potassium iodide is added as polymerization inhibitor. The resulting solution is heated to 75°C. under vacuum (16 mm.) and the distillate is collected in a dry ice-acetone trap, a small amount of air being bled in from time to time to stabilize the distillation and to assist removal of the isobutyl alcohol formed. After five minutes of heating, the vacuum is increased to 3 mm. and the temperature raised to 80°C. over ten minutes.

The vacuum is then broken, 0.5 ml. of concentrated hydrochloric acid is added and heating at 80°C. is continued for 15 minutes under a vacuum of 4 mm. A total of 35 g. of distillate is collected, equivalent to 94% of the calculated amount.

The product is substantially the same as that made by reacting N-(2-chloroethoxymethyl)acrylamide with trimethylamine.

I claim:

1. A water-soluble cationic polymer consisting essentially of 70 to 99 mol percent of acrylamide units and 30 to 1 mol percent of vinyl quaternary ammonium units of the formula

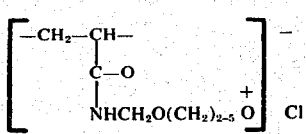

wherein Q is the residue of a water-soluble tertiary amine.

2. A polymer according to claim 1 wherein the vinyl quaternary ammonium units have the formula

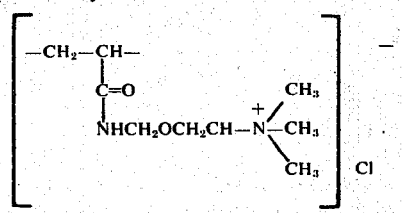

3. A polymer according to claim 1 wherein the acrylamide units and the vinyl quaternary ammonium units are present in molar ratio between 90 : 10 and 95 : 5.